United States Patent

[11] 3,559,786

| [72] | Inventor | Paul J. Long, Jr.<br>Dayton, Ohio |
|---|---|---|
| [21] | Appl. No. | 820,578 |
| [22] | Filed | Apr. 30, 1969 |
| [45] | Patented | Feb. 2, 1971 |
| [73] | Assignee | General Motors Corporation<br>Detroit, Mich.<br>a corporation of Delaware |

[54] VISCOUS FLUID CLUTCH WITH COOLING PASSAGE MEANS
12 Claims, 3 Drawing Figs.

| [52] | U.S. Cl. | 192/58, 192/82, 192/113 |
|---|---|---|
| [51] | Int. Cl. | F16d 35/00 |
| [50] | Field of Search | 192/58, 58(A1), 58(A2), 58(A3), 82, 113(.1), 113(.2) |

[56] References Cited
UNITED STATES PATENTS

| 2,902,127 | 9/1959 | Hardy | 192/58(A2) |
|---|---|---|---|
| 3,263,783 | 8/1966 | Sutaruk | 192/113(.1) |

*Primary Examiner*—Allan D. Herrmann
*Attorneys*—E. W. Christen, A. M. Heiter and John P. Moran

ABSTRACT: A viscous fluid clutch including relatively rotatable first and second drive members having a fluid shear space therebetween and which are cooperable with a fluid medium in the shear space to provide a shear-type fluid drive therebetween, an annular reservoir for at times storing the fluid medium, a temperature-responsive valve for regulating the flow of the fluid medium from the annular reservoir to the fluid shear space, and a baffle wall cooperating with a front wall of one of the drive members to form a narrow annular cooling passage for the fluid medium and further cooperating with an intermediate wall to form the annular reservoir.

PATENTED FEB 2 1971

3,559,786

INVENTOR.
Paul J. Long, Jr.
BY
John P. Moran
ATTORNEY

VISCOUS FLUID CLUTCH WITH COOLING PASSAGE MEANS

This invention relates generally to fluid drive devices, and more particularly to a fluid drive adapted to drive an accessory device, such as a cooling fan, for an internal combustion engine.

Vehicle cooling fans are generally belt-driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and as the speed of the engine increases, such as when the vehicle is running in direct drive at road speeds, the ram air cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

A primary object of the invention is to provide improved means for keeping the usual torque-transmitting fluid in the fluid-operating or working chamber of a viscous clutch as cool as possible and thereby control the fan speed by controlling the effectiveness of the viscous fluid clutch.

Another object of the invention is to provide improved means for controlling the temperature of the torque-transmitting fluid medium in an operating or working chamber of a viscous fluid clutch to thereby better control the slip speed between the driving member and the driven member.

A further object of this invention is to provide in a viscous fluid clutch unit an improved cooling passage for causing the maximum amount of fluid to be exposed to the outside surfaces for most efficient cooling of the fluid.

A further object of the invention is to provide a viscous shear fan drive having a housing including a rear wall, a finned front wall, a divider wall and a cooling baffle or baffle wall, there being formed between the rear and divider walls an operating chamber for a clutch plate in viscous shear drive relation with the housing, an annular reservoir formed between the divider and baffle walls and an annular cooling passage formed between the front and baffle walls and extending from the outer perimeter of the operating chamber past the outer diameter of the annular reservoir to the inner portion thereof, so that fluid pumped from the outer perimeter of the operating chamber is delivered directly to the cooling passage and enters the annular reservoir at its innermost diameter and remote from the valve-controlled outlet port communicating from the reservoir to the operating chamber.

These and other objects and advantages will become apparent when reference is made to the following description and the accompanying drawings wherein.

Figure 1:
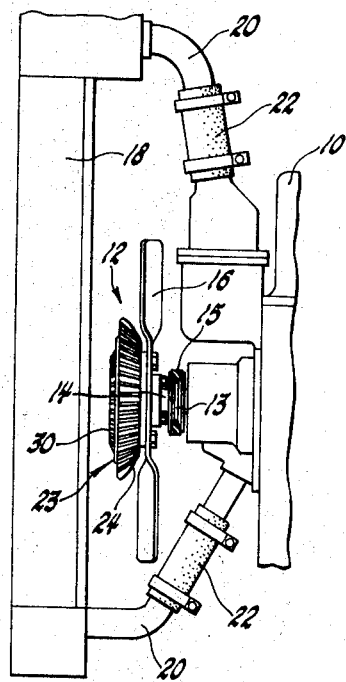
FIG. 1 is a fragmentary side elevational view of a radiator and engine having a viscous fluid clutch-driven cooling fan associated therewith.

Referring to the drawings in greater detail, FIG. 1 illustrates an engine 10 having an viscous fluid clutch 12 and a pulley 13 mounted on a drive shaft 14 extending therefrom, the pulley 13 being rotated by a V-belt 15 connected to the crankshaft (not shown) for driving a cooling fan 16 secured to the clutch 12. The fluid clutch 12 and the cooling fan 16 are located between the engine 10 and a radiator 18. The usual conduits 20 and associated hoses 22 communicate between the radiator 18 and the engine 10 adjacent the drive shaft 14.

Figure 2:
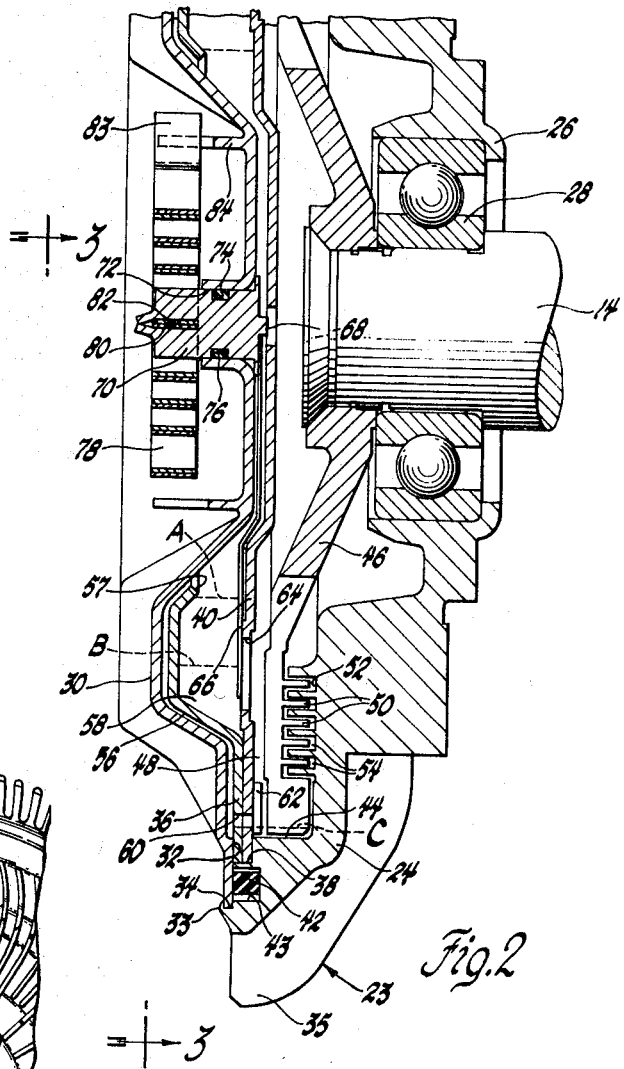
FIG. 2 is an enlarged fragmentary cross-sectional view of a viscous fluid clutch embodying the invention.

Referring now to FIG. 2, the fluid clutch 12 includes a housing 23 which includes a rear wall 24 having a hub 26 which is rotatably mounted by a suitable bearing 28 on the drive shaft 14. The housing 23 further includes a finned cover member or front wall 30 which has an annular flat surface 32 formed adjacent its peripheral edge, the latter being confined by an annular lip 33 in an annular recess 34 formed in the housing 23. Cooling fins 35 are formed on the outer surface of the rear wall 24, and a baffle wall or cooling baffle 36 is confined between the annular flat surface 32 of the front wall 30 and the outer surface of a divider wall 40 which is confined thereby in a second annular recess 38 which is formed radially inward of the outer periphery of the recess 34. A seal 42 is compressed by the cover member 30 in an annular groove 43 formed in the rear wall member 24 intermediate the outer edges of the annular recesses 34 and 38. A third annular deeper recess 44 is formed in the rear wall member 24 radially inward of the second recess 38. A clutch plate 46 is secured at its center by any suitable means to the drive shaft 14, the outer peripheral portion thereof being freely located in the operating chamber 48 formed by the third annular recess 44.

Adjacent portions of the clutch plate 46 and the rear wall 24 are provided with torque-transmitting elements consisting of cooperating annular ridge and groove elements 50 and 52, respectively, with an intervening fluid-shear space 54 therebetween to accommodate a viscous as a torque-transmitting medium.

It may be noted in FIG. 2 that the front wall 30 and the baffle wall 36 are cooperatively formed to include a narrow annular passage 56 therebetween radially inward from the flat mating surface 32, the annular passage 56 covering a substantial area and having an initial portion 57 not having a common wall with the annular reservoir 58 in order to better cool the torque-transmitting fluid. Both the front wall 30 and the baffle wall 36 include an annular bend intermediate the centers and peripheral edges thereof which forms an annular reservoir 58 between the baffle wall 36 and the divider wall 40. A pump outlet opening 60 is formed through the divider wall 40 and the baffle wall 36 adjacent a pump or dam element 62 formed on the divider wall 40, the opening 60 communicating between the operating chamber 48 and the narrow annular cooling passage 56. Since the cooling passage 56 is a large annular passage as compared to the outlet opening 60, the fluid spreads and contacts a large finned frontal cooling surface and slowly moves radially inward to the reservoir 58. The length of travel in the cooling passage 56 may be increased by providing a tortuous path, such as a spiral path, by using a spirally-grooved baffle wall 36 with the peaks in contact with the front wall 30. The pump element 62 may consist of a circular boss formed on the divider wall 40 by any suitable means, such as stamping, or it may be a rectangular-shaped or other-shaped member secured to the divider wall 40, such as by welding.

Figure 3:
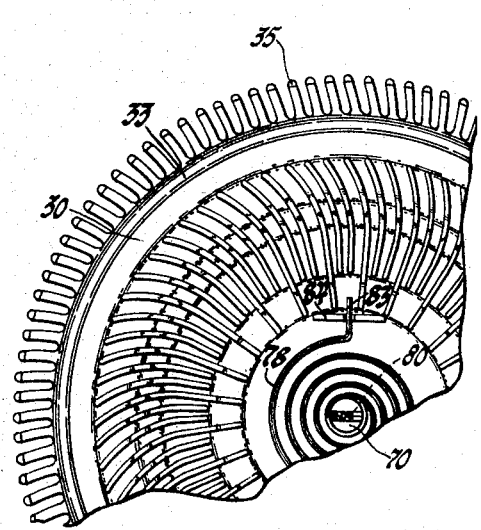
FIG. 3 is a fragmentary end view taken on the plane of the line 3-3 of FIG. 2, and looking in the direction of the arrows.

Another opening or inlet port 64 is formed in the divider wall 40, communicating between the annular reservoir 58 and the operating chamber 48 radially inward of the pump element 62 and the pump outlet opening 60. The opening or inlet 64 is at times closed off by a valve member 66. The valve member 66 is secured at its innermost end to a reduced diameter portion 68 of a center pin or shaft 70, which is rotatably mounted in a central opening 72 formed in the front wall or cover member 30. A seal ring 74 may be mounted in an annular groove 76 formed in the pin 70 within the opening 72 to prevent leakage therepast. A helically wound, bimetallic thermostatic valve control element 78 is provided with an inwardly extending end portion 80 which is mounted in a transverse slot 82 formed in the pin 70. An outwardly extending end portion 83 (FIG. 3) of the bimetallic element 78 is secured to a post 84. With this arrangement, a change in ambient temperature either winds or unwinds the bimetallic element 78, resulting in rotation of the pin 70 and the valve member 66.

The front wall 30 and rear wall 24 and the fins thereon are generally made of aluminum for good heat transfer to the ambient air. The divider wall 40 may be made of aluminum or steel. The cooling baffle wall 36 preferably has heat-insulating properties to reduce heat transfer from the cooling passage 56 to the reservoir 58, and thus is made of steel or, where higher heat-insulating properties are required, of a plastic material, such as silicone resin or a Teflon resin (polytetrafluoroethylene) which has good insulating properties and withstands hot silicone fluid.

OPERATION

So long as the vehicle engine 10 is in operation, the drive shaft 14 and the associated clutch plate 46 will be driven by the pulley 13 operatively connected via the belt 15 to the crankshaft (not shown) at an appropriate speed ratio with respect to engine speed. The initial position of the temperature-responsive valve member 66 will be closed across the opening 64 in the divider wall 40, and will remain closed so long as the engine is cold, thus preventing any flow of fluid from the annular reservoir 58 into the operating chamber 48. Since the pump outlet opening 60 is always open, providing continuous communication between the operating chamber 48 and the narrow annular passage 56, fluid will be pumped therethrough by virtue of the pump element 62 serving as a dam, forcing the fluid to flow into the opening 60 and, thence, radially inwardly through the narrow annular passage 56 to spill over the radial innermost edge 57 thereof, into the annular reservoir 58. The total volume of fluid is such that when the operating or working chamber 48 is substantially empty, i.e., at a level designated by dotted line "C," the fluid in the annular reservoir 58 will be held under the action of centrifugal force in the outer annular portion of the reservoir and have an inner annular liquid level "A," the head resulting from the fluid height "A" being offset by the force generated by the pumping action of the pump element 62 on the fluid remaining in the working chamber 48, to prevent any flowback through the opening 60. Under this condition, commonly known as the "disengaged mode," the slip between the clutch plate 46 and the housing 23 is greatest.

The cooling passage 56 will be completely filled due to centrifugal force providing a large surface area and a large thin volume for slow flow and maximum cooling. The spillover edge 57 is located within the outer portion of the reservoir 58 and both axially and radially remote from the inlet opening 64 for a long cooling flow path and long flow through the reservoir 58. The best cooling is obtained with the spillover edge 57 near, or preferably radially within, the liquid level "A." It should be noted that this locates the spillover edge 57 radially within the inlet port 64.

As the ambient temperature increases due to the warmup of the radiator and engine, the bimetallic thermostatic valve control element 78 will begin to wind up and, since it is restrained at its outer end by the post 84, its inner end 80 will rotate the pin 70 and the valve member 66, progressively uncovering the opening 64. As a result, fluid will flow through the opening 64 back into the operating chamber 48 in a progressively increasing volume with increasing temperature. Since the outlet flow through the opening 60 remains about constant, the operating chamber gradually fills until the inner annular level in both the operating chamber 48 and the annular reservoir 58 are at the level designated by "B." As the fluid is admitted to the operating chamber 48, filling the shear space 54 between the annular opposed spaced ridge and groove elements 50 and 52, the shear-type fluid drive therebetween will be influenced and slip speed, or the difference in speed between that of the clutch plate 46 and the housing 23, will decrease. The rotating pump or dam element 62 will continue to promote the circulation of fluid from the operating chamber 48 through the pump outlet opening 60 to the narrow annular passage 56 and thence to the annular reservoir 58 at a point remote from the inlet port 64, from whence it will flow through the reservoir 58 and return to the operating chamber 48 via the variably opening inlet 64.

When the cooling requirements are at a maximum, the temperature-responsive valve member 66 will have rotated completely away from the opening 64, permitting the fluid in the chambers 48 and 58 to reach a point of equilibrium, liquid level "B" in FIG. 2, causing the relatively rotatable drive members 46 and 24 to operate at minimum slip speed and thereby effecting a maximum cooling function, the fan 16 being secured to the outer portion of the rear wall 24 of the housing 23 (FIG. 1).

It is well known by those skilled in the art that the cooperating function of the ridge and groove elements of a viscous fluid clutch is adversely affected if the torque-transmitting fluid medium therebetween is not kept as cool as possible. The viscosity of the fluid changes appreciably with excessive temperature variation and materially and detrimentally affects the slip speed between the clutch plate 46 and the housing 23. Also, continued operation at excessively high temperatures will cause deterioration of the dimethol siloxane or diphenol siloxane or other silicone fluid, i.e., it will tend to gel and/or attain a permanent change in viscosity. Hence, it should be apparent that the narrow annular passage 56 provided by the invention serves as an improved means for helping to cool fluid passing therethrough, under the force created by the rotating pump or dam element 62, prior to its being spilled over the radial innermost edge 57 of the baffle wall 36 into the annular reservoir 58, by continuously exposing the fluid to a maximum area of the inside surface of the relatively cooler cover member or front wall 30.

The continuously circulating fluid in this fan drive is at the highest temperature when it leaves the extreme outermost portion of the working chamber 48. It is then pumped to the cooling passage 56 where it spreads out and contacts the entire large area of the inner surface of the finned front wall 30 on which the cooling airflow impinges. Thus, only the fluid circulated for cooling at its highest temperature over a long path contacts the entire area of the coolest portion of the housing 23 for maximum heat transfer for cooling. The fluid is thus cooled before it contacts and mixes with the body of fluid in the reservoir 58 and without forming a short circuit path directly from the pump outlet 60 to the inlet 64, which would reduce the temperature differential and the length of cooling path, providing less cooling effect.

The fluid in the reservoir 58 is not heated by mixing with the hot fluid directly at the pump outlet 60, but is first cooled and then delivered to the reservoir 58. The initial and hottest portion of the cooling flow passage 56 at the outer perimeter thereof does not have a common wall with the reservoir 58 to further minimize heat transfer to the body of fluid in the reservoir 58.

While but one embodiment of the invention has been shown and described, other modifications thereof are possible.

I claim:

1. A viscous clutch comprising first and second relatively rotatable drive means, said first drive means containing a fluid medium and having an annular operating chamber and a reservoir chamber, fluid shear drive means on said first and second drive means located in said operating chamber operable with said fluid medium to provide a shear-type fluid drive between said first and second drive means, said operating chamber having an outlet opening at an outer portion and an inlet opening at an inner portion, said first drive means having cooling passage means having an inlet connected to said outlet opening, a heat transfer portion cooled directly by ambient air and an outlet portion connected to said reservoir in a zone radially inward of the annular level of said fluid medium when all of said fluid medium is contained in said reservoir, and pump means on one of said drive means to pump said fluid medium from said operating chamber out of said outlet opening and through said cooling passage means and said outlet portion thereof to said reservoir chamber.

2. A viscous clutch comprising first and second relatively rotatable drive means, said first drive means having an annular operating chamber and a reservoir chamber, fluid shear drive means on said first and second drive means located in said operating chamber operable with a fluid to provide a shear-type fluid drive between said drive means, said operating chamber having an outlet opening at an outer portion and an inlet opening at an inner portion, said first drive means having cooling passage means having an inlet connected to said outlet opening, a heat-transfer portion cooled directly by ambient air and an outlet portion connected to said reservoir radially inward of said operating chamber, and pump means on one of said drive means to pump fluid from said operating chamber out of said outlet opening.

3. A viscous clutch comprising first and second relatively rotatable drive means, said first drive means having an annular operating chamber and a reservoir chamber, fluid shear drive means on said first and second drive means located in said operating chamber operable with a fluid to provide a shear-type fluid drive between said drive means, said operating chamber having an outlet opening at an outer portion and an inlet opening at an inner portion, said first drive means having cooling passage means having an inlet connected to said outlet opening, a heat-transfer portion cooled directly by ambient air for maintaining the fluid in the heat-transfer portion separate from the fluid in the reservoir and an outlet portion connected to said reservoir in a zone radially inward of and axially spaced from said inlet opening, and pump means on one of said drive means to pump fluid from said operating chamber out of said outlet opening.

4. A viscous fluid clutch comprising a first member, a second member including forward and rear walls encompassing said first member and being rotatably supported thereon, an operating chamber forming a viscous shear drive relation between said members, interior wall means cooperating with one of said members to form an annular reservoir therebetween, viscous fluid disposed in said operating chamber and adapted to be transferred to said annular reservoir, first and second ports operatively connected to said operating chamber, pump means operatively connected to said first member for pumping said viscous fluid from said operating chamber through said first port, said second port communicating with said annular reservoir, and cooling means including annular passage means having annular inner opening means adapted to receive said viscous fluid from said first port and to maintain said fluid in contact with one of said walls of said second member apart from said annular reservoir until delivery to the radially inner portion of said annular reservoir via said annular inner opening means.

5. The viscous fluid clutch described in claim 4, and valve means for controlling the flow of said viscous fluid through said second port.

6. The viscous fluid clutch described in claim 5, and temperature control means for operating said valve means.

7. A viscous clutch comprising first and second relatively rotatable drive members, said first drive member including a first wall, a second wall and a divider wall sealed between said first and second walls providing an operating chamber between said divider and second walls and a second chamber between said first and divider walls, fluid shear drive means on said first and second drive members in said operating chamber operable with a fluid medium to provide a shear-type fluid drive therebetween, baffle wall means between said first wall and said divider wall in said second chamber dividing said second chamber into an annular reservoir adjacent the divider wall and an annular cooling passage adjacent the front wall and having an inlet and an outlet delivering fluid to said reservoir for maintaining fluid in contact with the inner surface of said front wall and separate from fluid in said reservoir, a first opening means in said first member for providing communication from said operating chamber to said annular cooling passage inlet, pump means on one of said drive members for causing said fluid medium to flow from said operating chamber through said first opening means to said cooling passage inlet and second opening means formed in said divider wall for communicating said fluid medium from said reservoir to said operating chamber.

8. A viscous fluid clutch comprising an input shaft, a clutch plate secured to said shaft, a fluid clutch housing rotatably mounted on said input shaft, a cover member sealed to said housing, a divider wall secured for rotation with said cover member and said housing and mounted between said cover member and said clutch plate so as to form an annular chamber with said cover member and an operating chamber with said housing, baffle wall means secured for rotation with said cover member and said housing in said annular chamber and forming a narrow annular passage with said cover member and an annular reservoir with said divider wall, a first opening formed in said divider wall between said operating chamber and said narrow annular passage, pump means operatively connected to said divider wall for pumping a fluid medium from said operating chamber through said first opening to said annular passage, a second opening formed in said divider wall for at times communicating said fluid medium from said annular reservoir to said operating chamber, and temperature-responsive valve means operatively connected to said divider wall for controlling the flow of said fluid medium through said second opening, said narrow annular passage spacing said annular reservoir from said cover member and providing means for cooling said fluid medium prior to entry into said annular reservoir at a point radially inward of the inner annular surface level of said fluid medium as determined by the action of centrifugal force thereon.

9. A viscous fluid clutch comprising an input shaft, a first member secured to said shaft, a second member rotatably mounted on said input shaft, a cover member fixed to said second member such that said first member is relatively rotatable between said second member and said cover member, a divider wall secured for rotation with said cover member and said second member and mounted between said cover member and said first member so as to form an annular chamber with said cover member and an operating chamber with said second member, baffle wall means operatively connected to said cover member for rotation therewith in said annular chamber and forming a narrow annular passage with said cover and an annular reservoir with said divider wall, an annular opening formed at the radial innermost portion of said narrow annular passage adjacent said annular reservoir, a second opening formed in said divider wall between said operating chamber and said narrow annular passage, pump means operatively connected to said first and second members for forcing a fluid medium from said operating chamber through said second opening to said narrow annular passage bypassing said annular reservoir, said narrow annular passage serving to expose said fluid medium to a maximum area of said cover member prior to the exit of said fluid medium through said annular opening into said annular reservoir, thereby cooling said fluid medium, a third opening formed in said divider wall for permitting said fluid medium to flow from said annular reservoir to said operating chamber.

10. The viscous fluid clutch described in claim 9, and valve means operatively connected to said third opening for controlling passage of said fluid medium therethrough.

11. The viscous fluid clutch described in claim 10, and bimetallic thermostat means for actuating said valve means.

12. A viscous fluid clutch comprising first and second relatively rotatable drive members, said first drive member including front and rear walls and defining a fluid cavity therebetween, a divider wall sealed between said front and rear walls in said fluid cavity and dividing said fluid cavity into first and second chambers, said second drive member being rotatable in said first chamber, said second drive member and said rear wall having opposed spaced parallel surfaces defining a fluid shear space therebetween and cooperable with a fluid medium in said shear space to provide a shear-type fluid drive therebetween, baffle wall means operatively connected to said divider wall in said second chamber and dividing said second chamber into an annular reservoir and an annular cooling passage and forming an annular inner opening with said front wall, a first opening formed in said divider wall for providing communication between said first chamber and said annular cooling passage, a dam element formed on said divider wall in said first chamber adjacent said first opening for causing said fluid medium to flow through said first opening for varying the volume of fluid medium in said shear space to vary the torque transmitted between said first and second drive members, a second opening formed in said divider wall for at times communicating said fluid medium from said reservoir to said first chamber, a temperature-responsive valve for controlling the flow of said fluid medium through said second opening to further vary the torque transmitted between said first and second drive members, said annular cooling passage maintaining said fluid medium being pumped from said first chamber in contact with the inner surface of said front wall and delivering said fluid medium via said annular inner opening to the radial inner portion of said annular reservoir remote from said valve-controlled second opening.